Feb. 25, 1958 T. O. REOMER 2,824,391
SHOVEL ATTACHMENT FOR BULLDOZERS
Filed Nov. 13, 1953 2 Sheets-Sheet 2
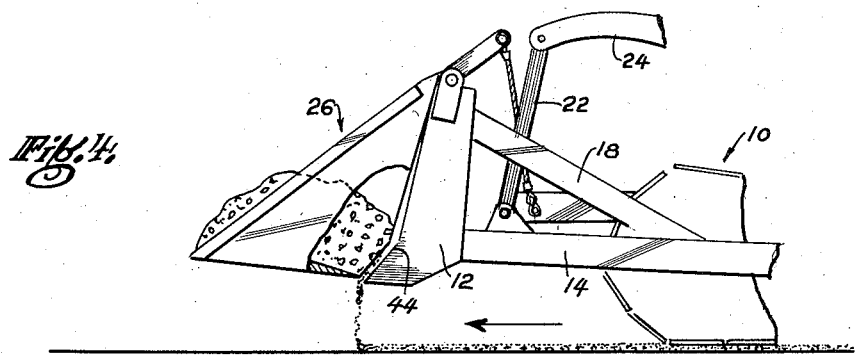
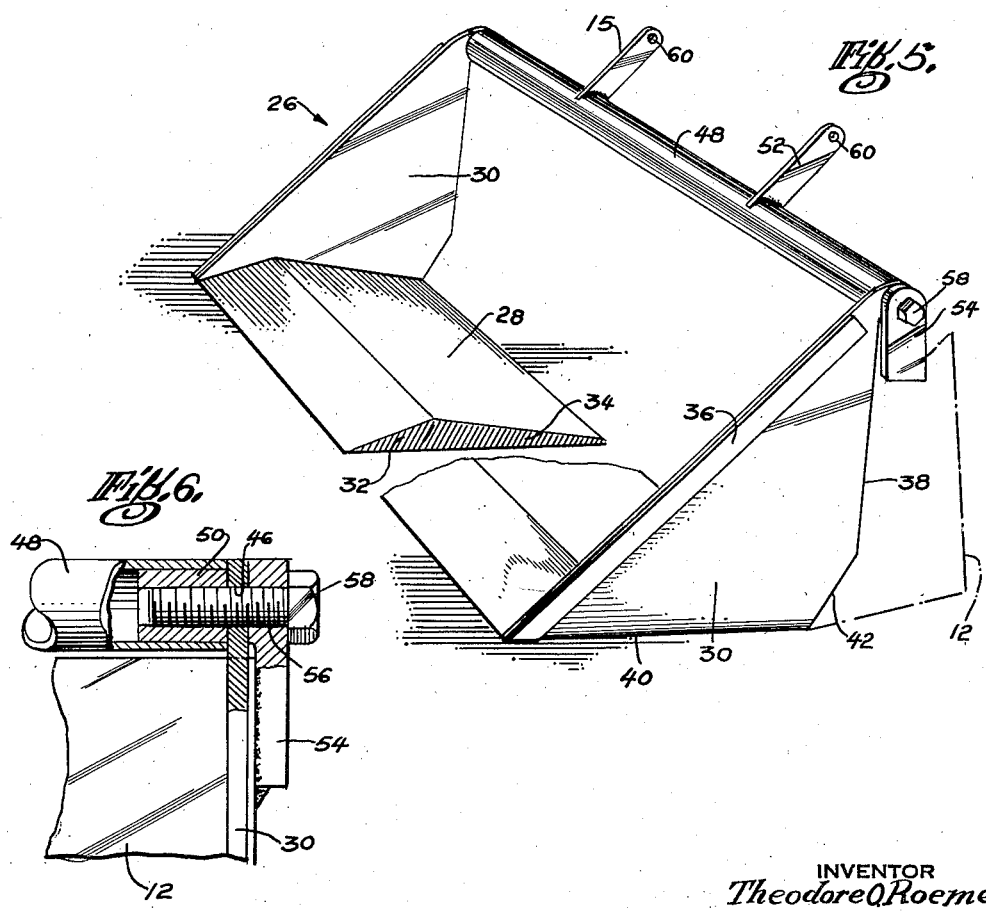
INVENTOR
*Theodore O Roemer*
BY *Leo C. Krazinski*
ATTORNEY United States Patent Office 2,824,391
Patented Feb. 25, 1958

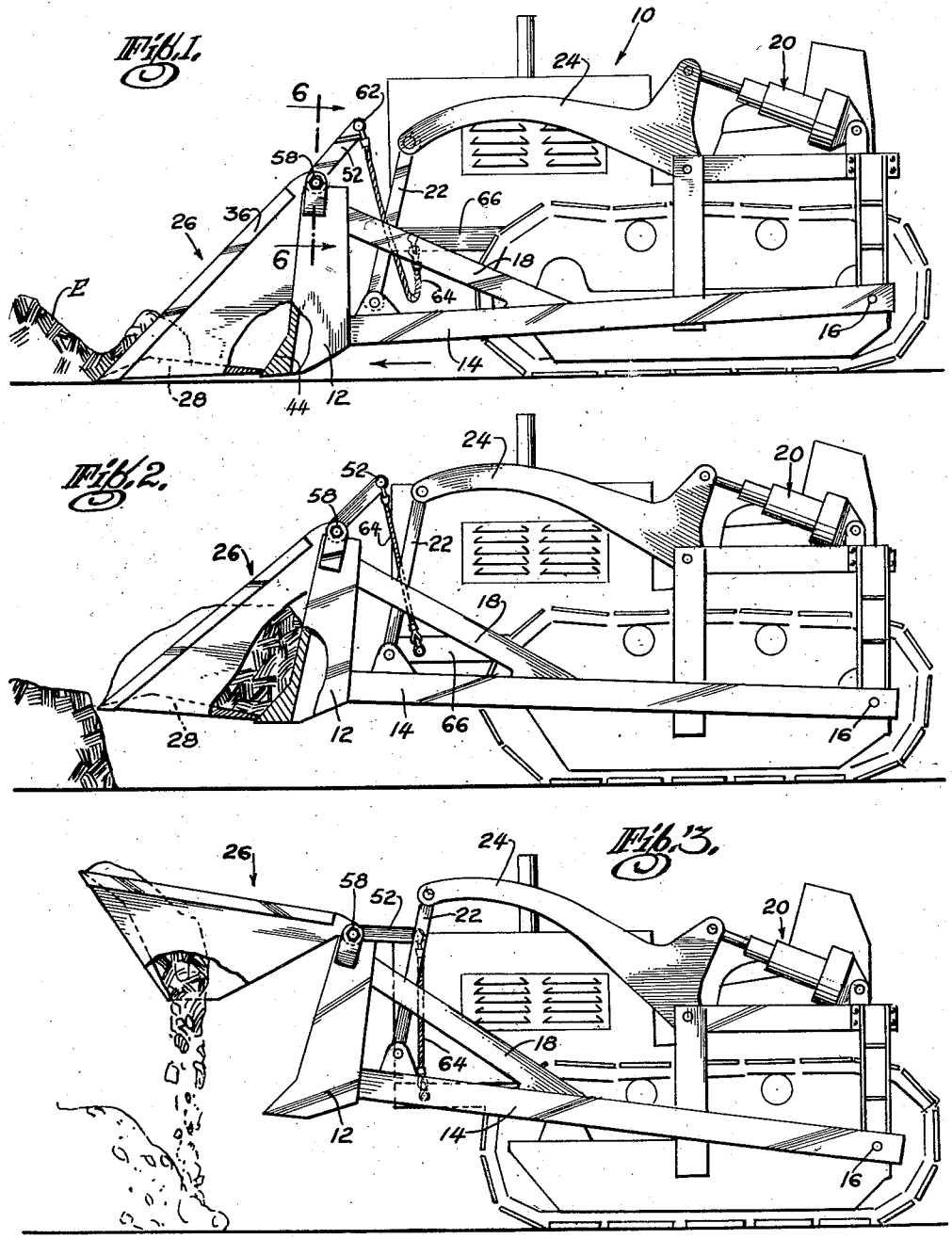

2,824,391

SHOVEL ATTACHMENT FOR BULLDOZERS

Theodore O. Roemer, Ridgewood, N. J., assignor to Leo C. Krazinski, New York, N. Y.

Application November 13, 1953, Serial No. 391,983

6 Claims. (Cl. 37—117.5)

This invention relates to tractors equipped with bulldozers, particularly to a combined bulldozer and tractor shovel and has for its primary object to provide an implement that can be used for pushing, pulling, or carrying material, when attached to a tractor.

Conventional bulldozers are well adapted for moving earth material, particularly on straightaways. However, when it comes to moving the material around corners and for substantial distances, other equipment provided with shovels must be used. This necessitates two items of equipment which increases not only the capital investment but also requires additional storage space therefor.

It is, therefore, another object of the invention to overcome the above disadvantages and to provide an adapter to a blade of the bulldozer which will enable the bulldozer not only to perform its usual functions but also carry the material a substantial distance and at an increased speed, thereby substantially reducing the time and expense in a given project.

Still another object of the invention is to provide a bulldozer attachment that will improve the earth-moving efficiency of the bulldozer.

Yet another object of the invention is to provide a bulldozer attachment that is inexpensive, easily installed, and readily operable in conjunction with the bulldozer blade.

According to a feature of the present invention advantages are secured over the prior designs by providing a shovel member having two sides and a base, but without a back, for pivotal attachment to a bulldozer blade, which functions as a back for the shovel, whereby the bottom of said shovel can be used in earth digging and pushing position in conjunction with the bulldozer blade while in its lowermost position, then in earth carrying position while in an intermediate position, and finally in an earth dumping position while in an upraised position.

This and other features of the invention will be more fully described in the following specification, taken in connection with the accompanying drawing, in which:

Fig. 1 shows a side elevational view of a conventional bulldozer equipped with a shovel of the present invention, the shovel being shown in an earth-pushing position;

Fig. 2 is a view similar to Fig. 1 in which the shovel is shown in an earth-carrying position;

Fig. 3 is a side view thereof showing the shovel in an earth-dumping position;

Fig. 4 is a side view of the front portion of the bulldozer illustrated in Fig. 2 with the shovel shown in an earth-carrying position, with the shovel spaced from the blade and adapted for depositing a predetermined layer thereof on the ground;

Fig. 5 is an enlarged, detailed view of the shovel; and

Fig. 6 is a view partly in section showing the means for pivotally attaching the shovel to the blade.

Referring now to the drawing, particularly to Fig. 1, there is shown a conventional caterpillar type tractor 10 equipped with a bulldozing blade 12 which is rigidly secured at its bottom to one end of a longitudinal beam 14 at each side thereof. The other end of beam 14 is pivotally supported upon a shaft 16 at the rear of the tractor. A strut 18 at each side interconnects the beam 14 with a top portion of the blade and an intermediate, transverse member (not shown) ties the two beams 14 together, so that the blade, struts, beams and members move as a single unit in response to hydraulic means 20 through connecting rod 22 and bell crank 24, as is conventional. It is customary in such bulldozing units to use the blade 12 for scarifying the ground, pushing and pulling earth, spreading the same, etc.

In the present invention the bulldozing blade 12 is adapted to form a back member to a bucket or shovel 26 (see Fig. 5) which comprises a bottom blade 28 and two side elements 30 connected to the blade in any suitable manner, as by welding. The bottom blade 28 is of sturdy construction having a tapered front edge 32, as well as a tapered rear edge 34, and is adapted for bulldozing purposes when resting against the bulldozer blade 12, as seen in Fig. 1. Each of the sides 30 is reinforced with a strap 36 along its front edge and is, in general, triangularly shaped. However, the rear edge 38 and the bottom edge 40 of each side 30 are joined at an angle, as seen at 42, which conforms with the angular portion 44 of the bulldozer blade 12, and thereby enables the shovel 26 to make a snug fit with the bulldozer blade 12 when in the closed position.

At the upper end of each side 30 there is shown an opening 46 (Fig. 6) and in axial alignment with said openings is interposed a tubular member 48, which is secured at each end to the respective sides 30 in any suitable manner, as by welding, to form a rigid shovel type implement. Prior to securing the tube 48 to the sides 30, each end of the tube is provided with a hollow, fixed bushing 50, for a purpose that will be explained hereinafter. A pair of spaced brackets 52 are secured, as by welding, to the tube 48 and it will be noted at this point that the brackets 52, tube 48, sides 30, and bottom blade 28 all move together as a unit.

In Figs. 5 and 6 are shown the manner of pivotally mounting the shovel to the bulldozer blade. A strap member or bracket 54 having a threaded opening 56 is rigidly secured, as by welding, to the upper side portions of the bulldozer blade 12, the openings thereof being located above the upper edge of the blade 12 so as to permit swinging movement of the shovel 26 when mounted thereupon. In assembling the shovel to the bulldozer it is merely necessary to align the openings 56 and 46 of the brackets 54 and sides 30, respectively, after which a bolt 58 is threaded through threaded opening 56 and thence passed through opening 46 into bushing 50, there being sufficient clearance in opening 46 and bushing 50 to permit free rotational movement of the tubular member 48. The two bolts 58, which are rigidly secured to the brackets 54 mounted on the bulldozer blade, thus provide trunnions for pivotally supporting the shovel.

To provide for separation of the shovel from the bulldozer blade, as seen in Figs. 3 and 4, the free ends of the brackets 52 are formed with openings 60 through each of which a suitable pin 62 is passed for attachment to one end of a cable 64. The other ends of the two cables 64 are similarly fastened to a stationary frame member 66 of the tractor, as best seen in Fig. 2. Both cables are of the same predetermined length and it will be readily seen that, since the lower ends of the cables are fastened to the stationary member 66 and the upper ends thereof to brackets 52, upward movement of the blade beyond a predetermined point will cause rotation of the shovel 26 including the tubular member 48 on the trunnions 58 and thereby separate the shovel from the bulldozer blade.

Assuming that the shovel of the invention has been assembled in the manner hereinbefore described, the operation thereof will now be described. As seen by the arrow in Fig. 1, the bulldozer 10 is urging the shovel 26 forward in a pushing operation with the bottom blade 28 thereof at ground level, whereby earth material E is received into the shovel. In this position of the machine it will be noted that the cable 64 is slack and that the shovel 26 is dependent from the trunnions with the rear side edges 38 against the bulldozer blade 12. After the shovel is loaded, the blade 12 is raised by the hydraulic means 20 through bell cranks 24, connecting rods 22 and beams 14, the latter beams fulcruming on shaft 16 and raising the blade and shovel assembly say, to the position shown in Fig. 2. The material E is then carried to the desired location where it is dropped in the manner seen in Fig. 3, by separating the shovel from the bulldozer blade, as described hereinbefore.

Referring back to Fig. 2, it will be seen that the cable 64 is taut and that the shovel is in a closed position. Further upward movement of the bulldozer blade 12 by the hydraulic means 20 would gradually separate the shovel from the blade, as seen in Fig. 4, where the machine is being used for spreading a small layer of material on the ground. Therefore, the length of cable 64 determines the position at which the shovel will start to open. In the present instance the cable length is such that the shovel will "crack" after the bulldozer blade 12 has passed about one-half of its working height. At the full-open position of the shovel, as seen in Fig. 3, the bulldozer blade has been raised to its full working height.

From the foregoing description, it will be seen that the present invention provides an improved attachment that can be readily attached to a bulldozer for the carrying of material as well as pushing the same. The attachment is simple in structure, comprises few parts, and is comparatively low in cost. When assembled to a bulldozer, the machine can then be driven into ordinary inaccessible corners, pick up the material and then back up with it. Further advantages are apparent from the foregoing description.

As various changes may be made in the form, construction and arrangement of the parts herein, without departing from the spirit and scope of the invention and without sacrificing any of its advantages, it is to be understod that all matters are to be interpreted as illustrative and not in any limiting sense.

What is claimed is:

1. In a tractor having a bulldozing blade, a hydraulic power means for actuating said blade and a stationary frame, a shovel attachment therefor comprising a bottom member having a flat underside portion, a pair of side members each rigidly secured to the bottom member, a transverse member rigidly interconnecting said sides adjacent the upper portions thereof, whereby said bottom, side, and transverse members are formed into a unitary attachment, means rigidly secured to said bulldozing blade for pivotally supporting said attachment, whereby a rear edge of each of said bottom and side members is adapted to normally rest by virtue of gravity against said blade and thereby employ said blade as a back member thereof, means interconnecting said stationary frame and said attachment for gradually moving said attachment from a resting position against said blade to a position separated therefrom, after said blade in response to said hydraulic power means has been raised beyond a predetermined height, said attachment being responsive to movement of said blade beyond said predetermined height.

2. In a tractor having a bulldozing blade, a hydraulic power means for actuating said blade and a stationary frame, a swingable shovel attachment therefor comprising a bottom member having a flat underside portion, a pair of side members each rigidly secured to the bottom member, a transverse member rigidly interconnecting said sides adjacent the upper portions thereof, whereby said bottom, side, and transverse members are formed into a unitary attachment, trunnions rigidly secured to said bulldozing blade for pivotally supporting said attachment, whereby a rear edge of each of said bottom and side members is adapted to normally rest by virtue of gravity against said blade, an arm rigidly secured to said transverse member in spaced relation to said trunnions, means interconnecting said stationary frame and said arm for gradually moving said attachment from a resting position against said blade to a position separated therefrom, after said blade in response to said hydraulic power means has been raised beyond a predetermined height, said attachment being responsive to movement of said blade beyond said predetermined height.

3. In a tractor having a bulldozing blade, a hydraulic power means for actuating said blade and a stationary frame, a swingable shovel attachment therefor comprising a bottom member having a flat underside portion, a pair of substantially triangular side members each rigidly secured to the bottom member and each having an opening therethrough adjacent its apex, a transverse tubular member rigidly interconnecting said sides adjacent said apexes in alignment with said openings, whereby said bottom, side, and transverse members are formed into a unitary attachment, means rigidly secured to said bulldozing blade and journalled in said tubular and side members for pivotally supporting said attachment, whereby a rear edge of each of said bottom and side members is adapted to normally rest by virtue of gravity against said blade, an arm rigidly secured to said tubular member intermediate said pivotally supporting means, a cable interconnecting said stationary frame and said arm for gradually moving said attachment from a resting position against said blade to a position separated therefrom, after said blade in response to said hydraulic power means has been raised beyond a predetermined height, said attachment being responsive to movement of said blade beyond said predetermined height.

4. In a tractor according to claim 3, wherein said pivotally supporting means include a bushing in each end of said tubular member, a pin journalled in each of said bushings, and a bracket rigidly secured to said pin and bulldozing blade.

5. A swingable shovel, open at the front and rear, for a bulldozer having a movable blade and a stationary frame member comprising a base plate having a flat underside portion, a side member rigidly secured at its bottom edge to each side of said base plate, a cross member rigidly secured to a top portion of said side members, means for pivotally supporting said cross member to the movable blade, whereby a rear edge of each of said base plate and side members will normally rest by virtue of gravity against said blade, and means interconnecting said cross member and said stationary frame member for gradually swinging said shovel away from said blade after the blade has been raised to a predetermined height, said shovel being responsive to movement of said blade beyond said predetermined height.

6. A swingable shovel for a bulldozer having a movable blade and a stationary frame member comprising a bottom blade having a flat underside portion for picking up earth, a substantially triangular side member rigidly secured at its bottom edge to each side of said bottom blade, a tubular cross member rigidly secured to an apex portion of said side members, means including a pair of trunnions each rigidly secured adjacent an upper edge portion of said movable blade for pivotally supporting said cross member to the movable blade, whereby a rear edge of each of said bottom blade and side members will normally rest by virtue of gravity against said movable blade, an arm rigidly secured to said cross member, and means interconnecting said arm and said stationary frame member for gradually separating said shovel from said movable blade when the latter has been raised to a predetermined height, said shovel being responsive to movement of said blade beyond said predetermined height.

References Cited in the file of this patent

UNITED STATES PATENTS

| | | |
|---|---|---|
| 1,733,969 | Knapp | Oct. 29, 1929 |
| 1,811,030 | Shaw | June 23, 1931 |
| 2,326,338 | Drott et al. | Aug. 10, 1943 |
| 2,332,561 | Drott | Oct. 26, 1943 |
| 2,455,474 | Drott et al. | Dec. 7, 1948 |
| 2,457,346 | Carlson et al. | Dec. 28, 1948 |
| 2,515,384 | Von Carnop | July 18, 1950 |
| 2,529,208 | Andersen | Nov. 7, 1950 |
| 2,563,974 | Thierry | Aug. 14, 1951 |
| 2,599,491 | Shoosmith | June 3, 1952 |

FOREIGN PATENTS

| | | |
|---|---|---|
| 1,012,211 | France | Apr. 9, 1952 |